US007408690B2

(12) United States Patent
Mizoguchi

(10) Patent No.: US 7,408,690 B2
(45) Date of Patent: Aug. 5, 2008

(54) ACTUATOR, OPTICAL SCANNER, AND IMAGE FORMING APPARATUS

(75) Inventor: Yasushi Mizoguchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/856,141

(22) Filed: Sep. 17, 2007

(65) Prior Publication Data

US 2008/0068688 A1   Mar. 20, 2008

(30) Foreign Application Priority Data

Sep. 19, 2006  (JP)  .............................. 2006-253524

(51) Int. Cl.
 *G02B 26/08*  (2006.01)
(52) U.S. Cl. .................... 359/224; 359/198; 359/199; 310/36
(58) Field of Classification Search ............... 359/224
 See application file for complete search history.

(56) References Cited

U.S. PATENT DOCUMENTS 5,543,956 A * 8/1996 Nakagawa et al. .......... 359/225
5,969,465 A * 10/1999 Neukermans et al. ....... 310/333

FOREIGN PATENT DOCUMENTS

JP      06-175060      6/1994

* cited by examiner

*Primary Examiner*—James Phan
(74) *Attorney, Agent, or Firm*—Workman Nydegger

(57) ABSTRACT

An actuator includes a frame-shaped first mass portion; a supporting portion that supports the first mass portion and takes the shape of a frame so as to surround a perimeter of the first mass portion; a pair of first elastic portions coupling between the first mass portion and the supporting portion so that the first mass portion is supported by the supporting portion; a second mass portion provided inside the frame-shaped first mass portion; a pair of second elastic portions coupling between the second mass portion and the first mass portion so that the second mass portion is supported by the first mass portion; and a driver for rotating the first mass portion. The driver includes a ferromagnet provided on the first mass portion in a position separate from a rotation central axis of the first mass portion; a coil formed along the rotation central axis of the first mass portion and the supporting portion so as to surround and orbit a perimeter of the ferromagnet if the first mass portion is seen from above; and a voltage application unit for applying a voltage to the coil. An operation of the voltage application unit included in the driver causes the coil to generate a magnetic field. The generation of the magnetic field causes displacement of the ferromagnet relative to the coil. The displacement of the ferromagnet causes the first mass portion to rotate while torsionally deforming the pair of first elastic portions. The rotation of the first mass portion causes the second mass portion to rotate while torsionally deforming the pair of second elastic portions.

11 Claims, 9 Drawing Sheets

ACTUATOR, OPTICAL SCANNER, AND IMAGE FORMING APPARATUS

TECHNICAL FIELD

The present invention relates to an actuator, an optical scanner, and an image-forming device.

RELATED ART

As optical scanners for forming images by performing an optical scan for use with a laser printer or the like, one using an actuator having a structure including a torsional vibrator for size reduction or other purposes is known (for example, see JP-A-06-175060).

For example, an actuator according to JP-A-06-175060 includes a frame-shaped member, a pair of torsional springs for supporting the frame-shaped member from both sides, a plate-shaped member (reflection mirror) provided inside the frame-shaped member, and a pair of torsional springs for supporting the plate-shaped member from both sides relative to the frame-shaped member. These members constitute a two-degree-of-freedom vibration system. In the actuator, a structure including the above-mentioned vibration system is supported by a supporting board.

The actuator also includes a permanent magnet provided on the frame-shaped member in a position separated from the rotation central axis of the frame-shaped member and a coil (electromagnet) provided on the supporting board so as to face the permanent magnet. Applying a voltage to this coil causes the frame-shaped member, thereby causing the plate-shaped member to vibrate.

Such an actuator allows an increase in the rotation angle (amplitude) of the plate-shaped member while controlling the rotation angle (amplitude) of the frame-shaped member.

However, since the actuator according to JP-A-06-175060 has the coil provided on the supporting board as described, the frame-shaped member must rotate at an angle such that no contact is made between the permanent magnet and the board as well as between the frame-shaped member and the coil.

Thus the distance between the permanent magnet and the coil must be made longer to increase the rotation angle of the frame-shaped member. Accordingly a current to be sent to the coil must be increased. This results in an increase in power consumption. Making longer the distance between the permanent magnet and the coil causes upsizing of the actuator. Further, making longer the permanent magnet-coil distance leads to disposition of the permanent magnet and the coil on separate boards. This requires alignment when these components are mounted, resulting in an increase in production cost.

SUMMARY

An advantage of the invention is to provide an actuator, an optical scanner, and an image-forming device that each allow an increase in deflection angle while promoting power-saving and size reduction.

According to a first aspect of the invention, an actuator includes a frame-shaped first mass portion; a supporting portion that supports the first mass portion and takes the shape of a frame so as to surround a perimeter of the first mass portion; a pair of first elastic portions coupling between the first mass portion and the supporting portion so that the first mass portion is supported by the supporting portion; a second mass portion provided inside the frame-shaped first mass portion; a pair of second elastic portions coupling between the second mass portion and the first mass portion so that the second mass portion is supported by the first mass portion; and a driver for rotating the first mass portion. The driver includes a ferromagnet provided on the first mass portion in a position separate from a rotation central axis of the first mass portion; a coil formed along the rotation central axis of the first mass portion and the supporting portion so as to surround and orbit a perimeter of the ferromagnet if the first mass portion is seen from above; and a voltage application unit for applying a voltage to the coil. An operation of the voltage application unit included in the driver causes the coil to generate a magnetic field. The generation of the magnetic field causes displacement of the ferromagnet relative to the coil. The displacement of the ferromagnet causes the first mass portion to rotate while torsionally deforming the pair of first elastic portions. The rotation of the first mass portion causes the second mass portion to rotate while torsionally deforming the pair of second elastic portions.

This allows a reduction in the distance between the coil and the ferromagnet without preventing rotation of the first mass portion. Thus the rotation angle (deflection angle) of the first mass portion is increased while promoting size reduction and power-saving of the actuator, thereby eventually increasing the rotation angle (deflection angle) of the second mass portion.

In the actuator according to the first aspect of the invention, the ferromagnet is preferably mainly made of a soft magnetic material.

This allows selection from a wider range of materials, thereby increasing freedom in designing.

In the actuator according to the first aspect of the invention, the voltage application unit is preferably configured to intermittently apply a direct current to the coil.

This allows the configuration of the voltage application unit to be made relatively simple, thereby reducing the cost of the actuator.

In the actuator according to the first aspect of the invention, the coil is preferably provided on a first surface of the first mass portion and the ferromagnet is preferably provided on a second surface of the first mass portion.

This allows the coil and the ferromagnet to be separated from each other in the thickness direction of the first mass portion relatively easily and accurately.

In the actuator according to the first aspect of the invention, the first mass portion, the pair of first elastic portions, the second mass portion, the pair of second elastic portions, and the supporting portion are formed integrally.

This allows the structure including these components to be easily manufactured by processing a single board.

In the actuator according to the first aspect of the invention, the coil is formed of a unilaminar metal layer.

This allows the coil to be easily formed by making a film.

In the actuator according to the first aspect of the invention, the ferromagnet is disposed near a central portion of the coil if the first mass portion is seen from above.

This allows a magnetic field generated from the coil to effectively act on the ferromagnet. As a result, the deflection angle is increased while promoting power-saving and size reduction.

In the actuator according to the first aspect of the invention, the ferromagnet is provided so as to extend over the entire first mass portion in a rotation central axis direction of the first mass portion in the separate position.

This allows a magnetic field generated from the coil to effectively act on the ferromagnet. As a result, the deflection angle is increased while promoting power-saving and size reduction.

In the actuator according to the first aspect of the invention, the second mass portion includes a light reflector having light reflectivity.

This allows the actuator according to this invention to be applied to optical devices, such as optical scanners, optical switches, and optical attenuators.

According to a second aspect of the invention, an optical scanner includes a frame-shaped first mass portion; a supporting portion that supports the first mass portion and takes the shape of a frame so as to surround a perimeter of the first mass portion; a pair of first elastic portions coupling between the first mass portion and the supporting portion so that the first mass portion is supported by the supporting portion; a second mass portion that is provided inside the first mass portion and includes a light reflector having light reflectivity; a pair of second elastic portions coupling between the second mass portion and the first mass portion so that the second mass portion is supported by the first mass portion; and a driver for rotating the first mass portion. The driver includes a ferromagnet provided on the first mass portion in a position separate from a rotation central axis of the first mass portion; a coil formed along the rotation central axis of the first mass portion and the supporting portion so as to surround and orbit a perimeter of the ferromagnet if the first mass portion is seen from above; and a voltage application unit for applying a voltage to the coil. An operation of the voltage application unit included in the driver causes the coil to generate a magnetic field. The generation of the magnetic field causes displacement of the ferromagnet relative to the coil. The displacement of the ferromagnet causes the first mass portion to rotate while torsionally deforming the pair of first elastic portions. The rotation of the first mass portion causes the second mass portion to rotate while torsionally deforming the pair of second elastic portions so that light reflected off the light reflector is scanned.

Thus, an optical scanner that allows an increase in the rotation angle of the second mass portion while promoting power-saving and size reduction is provided.

According to a third aspect of the invention, an image-forming device includes a frame-shaped first mass portion; a supporting portion that supports the first mass portion and takes the shape of a frame so as to surround a perimeter of the first mass portion; a pair of first elastic portions coupling between the first mass portion and the supporting portion so that the first mass portion is supported by the supporting portion; a second mass portion that is provided inside the first mass portion and includes a light reflector having light reflectivity; a pair of second elastic portions coupling between the second mass portion and the first mass portion so that the second mass portion is supported by the first mass portion; a driver for rotating the first mass portion; and a light emitter for emitting light toward the light reflector. The driver includes a ferromagnet provided on the first mass portion in a position separate from a rotation central axis of the first mass portion; a coil formed along the rotation central axis of the first mass portion and the supporting portion so as to surround and orbit a perimeter of the ferromagnet if the first mass portion is seen from above; and a voltage application unit for applying a voltage to the coil. An operation of the voltage application unit included in the driver causes the coil to generate a magnetic field. The generation of the magnetic field causes displacement of the ferromagnet relative to the coil. The displacement of the ferromagnet causes the first mass portion to rotate while torsionally deforming the pair of first elastic portions. The rotation of the first mass portion causes the second mass portion to rotate while torsionally deforming the pair of second elastic portions so that light reflected off the light reflector is main-scanned and/or sub-scanned to form an image on a target.

Thus, an image-forming device that allows an increase in the rotation angle of the second mass portion while promoting power-saving and size reduction is provided. In particular, since the rotation angle of the second mass portion is increased, light emitted toward the target is main-scanned and/or sub-scanned over a wide range. As a result, the image-forming device is reduced in size. If the image-forming device according to the invention is applied to a display such as an imaging display, the distance between the target and the optical scanner is reduced and the screen (target) as a display area is increased in size while controlling upsizing of the image-forming device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described in detail with reference to the accompanying drawings.

First Embodiment

A first embodiment of the invention will be described below.

Figure 1:
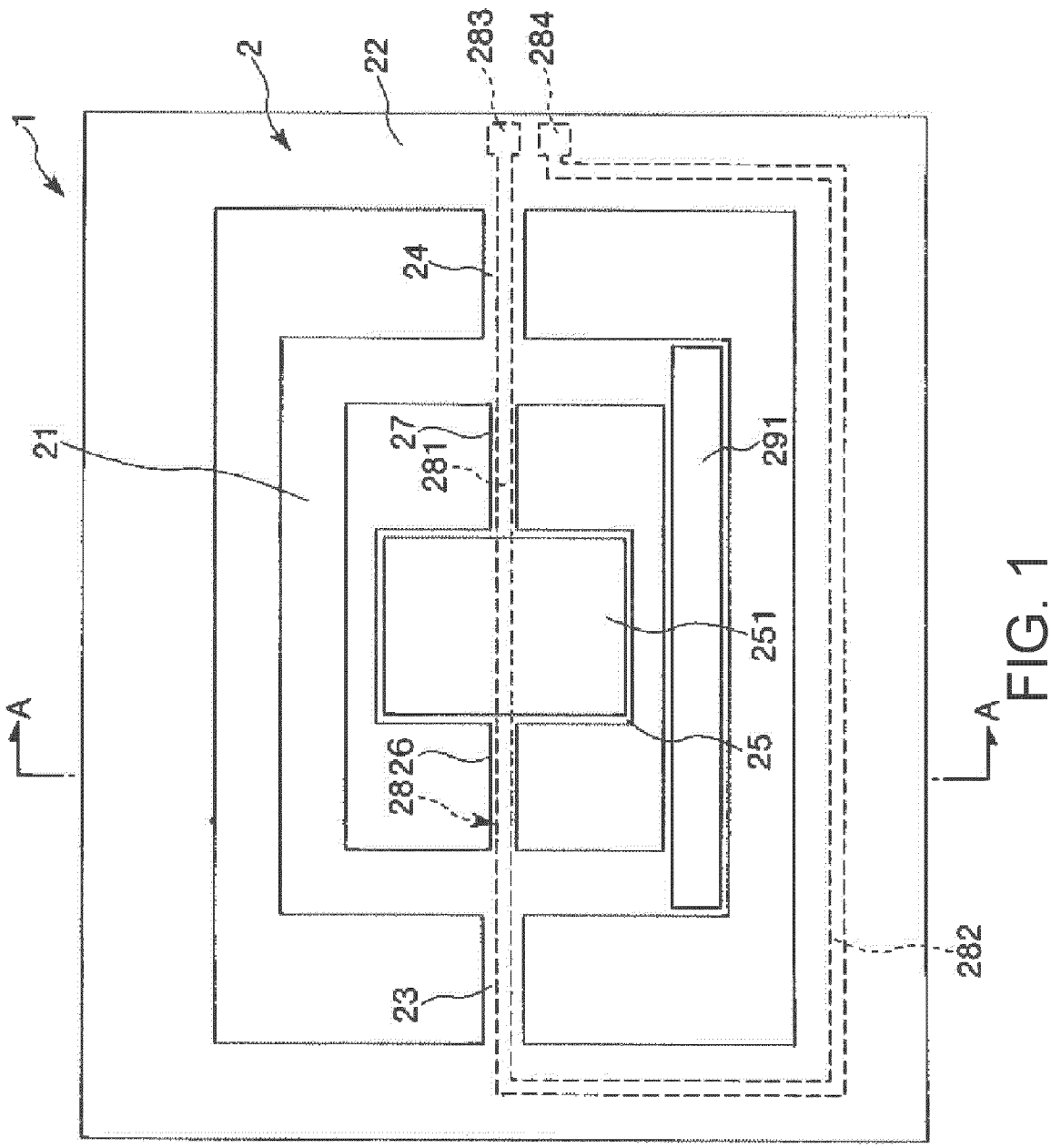
FIG. 1 is a plan view showing an actuator according to a first embodiment of the invention.
Figure 2:
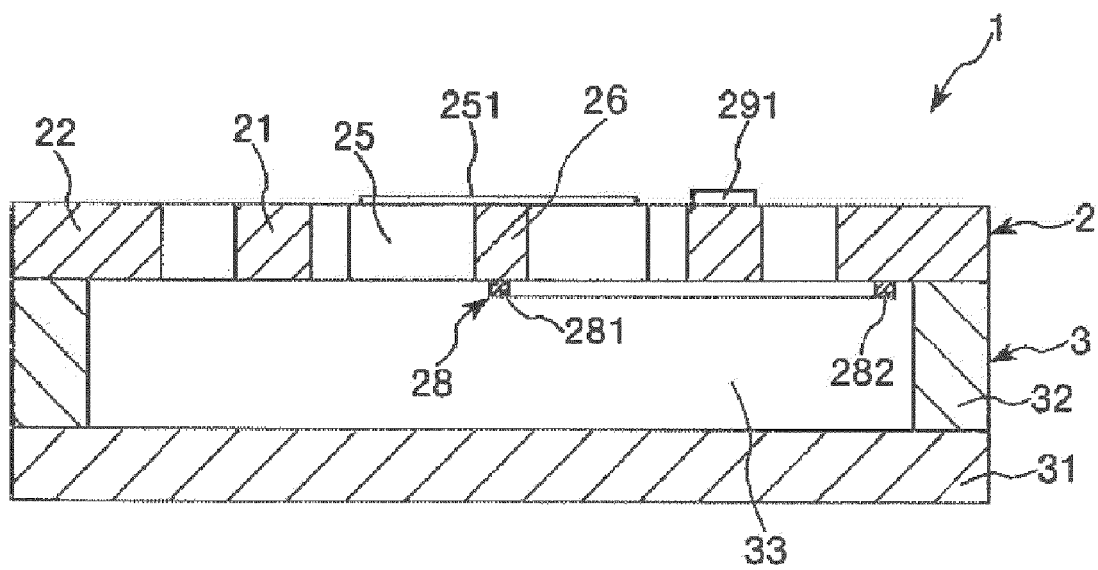
FIG. 2 is a sectional view taken along line A-A of FIG. 1.
Figure 3:
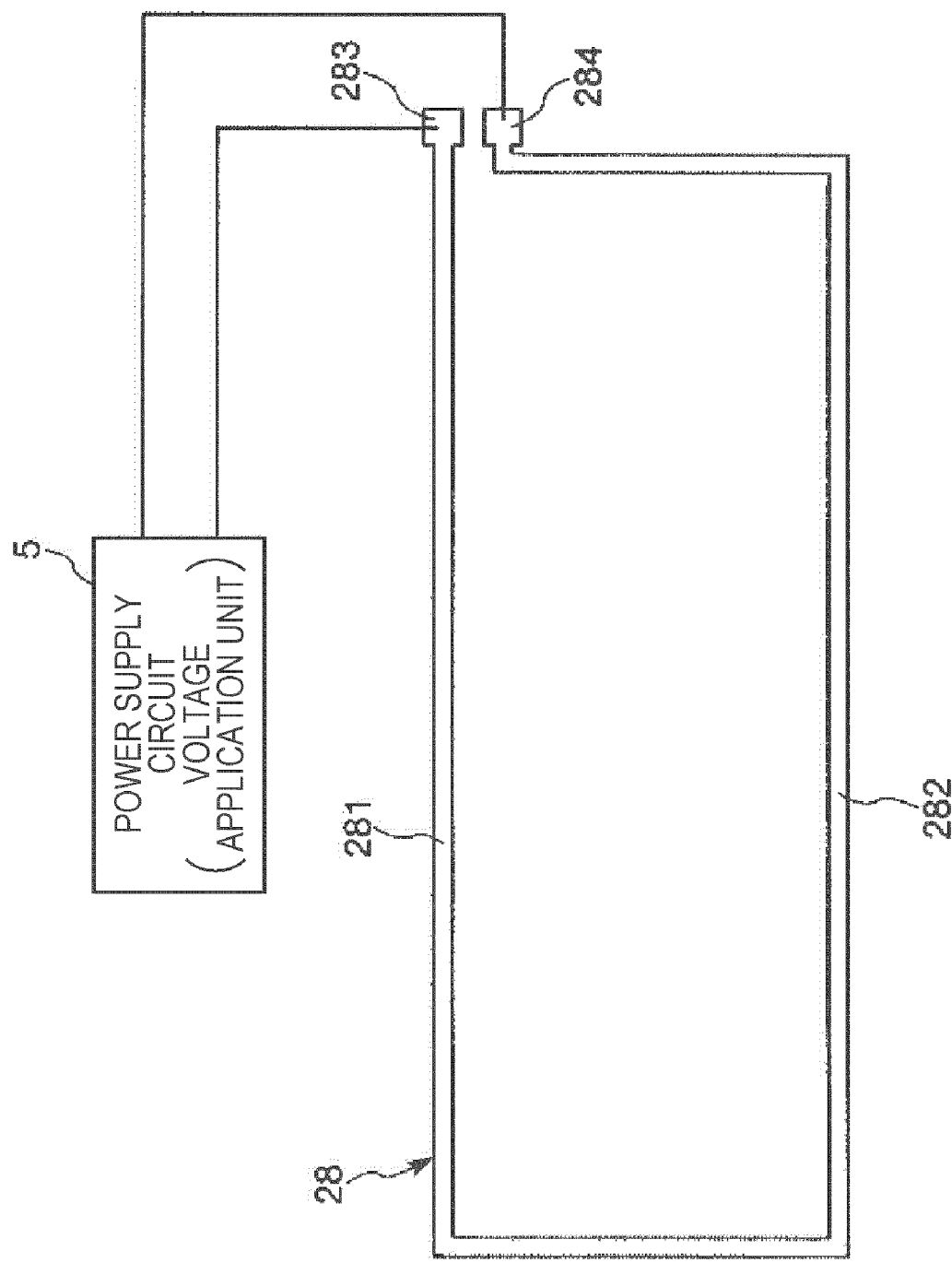
FIG. 3 is a diagram showing a coil provided on the actuator shown in FIG. 1.
Figure 4:
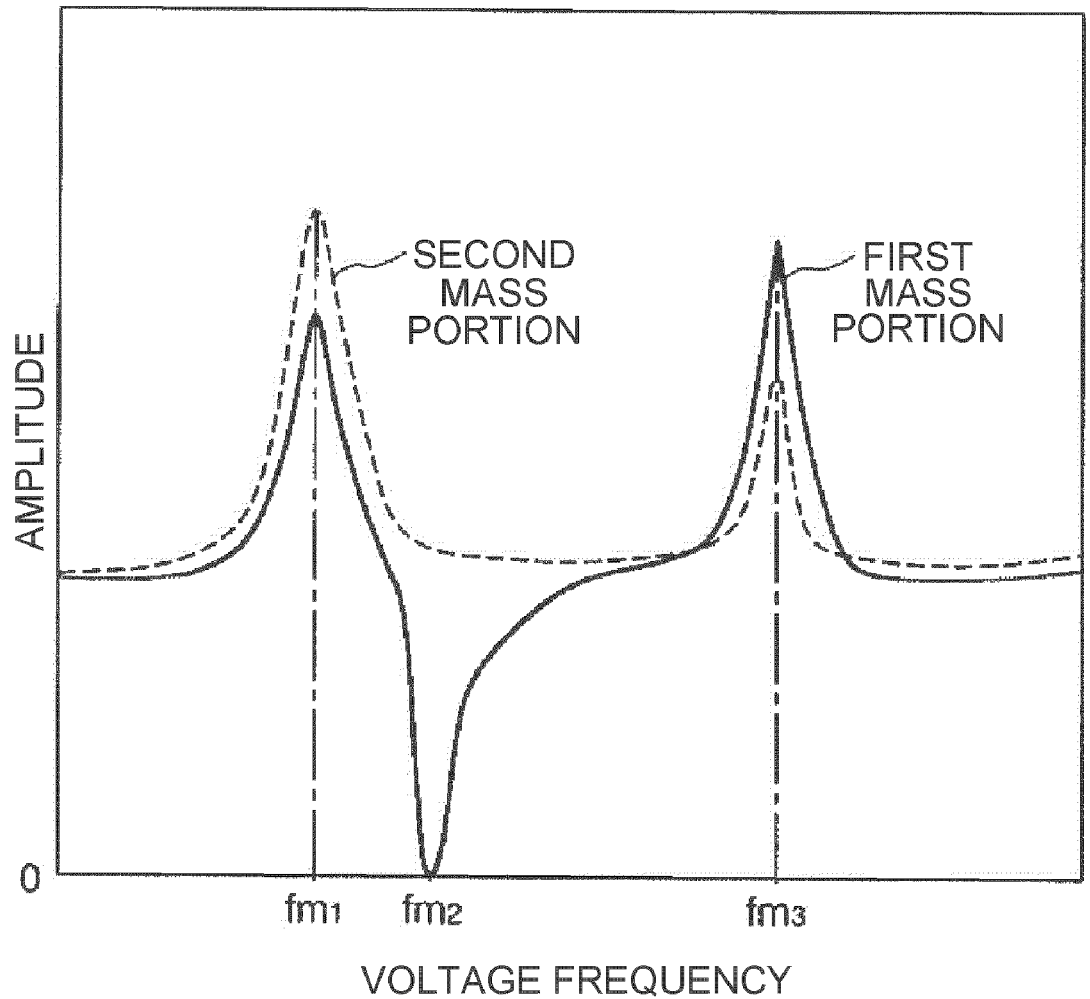
FIG. 4 is graph showing the relation between the amplitudes of a first mass portion and a second mass portion and the frequency of an applied voltage, of the actuator shown in FIG. 1.

FIG. 1 is a plan view showing an actuator according to the first embodiment of the invention. FIG. 2 is a sectional view taken along line A-A of FIG. 1. FIG. 3 is a diagram showing a coil included in the actuator shown in FIG. 1. FIG. 4 is a graph showing the relations between the amplitudes of a first mass portion and a second mass portion and the frequency of an applied voltage, of the actuator shown in FIG. 1.

In FIG. 1, the direction from the paper surface toward the viewer will be referred to as "upper," the direction from the paper surface toward the back as "lower," the right direction as "right," and the left direction as "left" for the sake of convenience. In FIG. 2, the upper direction will be referred to as "upper," and the lower direction as "lower," the right direction as "right," and the left direction as "left."

An actuator 1 shown in FIGS. 1 and 2 includes a base 2 having a two-degree-of-freedom vibration system, and a supporter 3 supporting the base 2.

As shown in FIG. 1, the base 2 includes a frame-shaped first mass portion 21, a supporting portion 22 for supporting the first mass portion 21, a pair of first elastic portions 23, 24 for coupling between the first mass portion 21 and the supporting portion 22, a second mass portion 25 provided inside the first mass portion 21, and a pair of second elastic portions 26, 27 for coupling between the first and second mass portions 21, 25.

In this embodiment, the base 2 is formed so as to be symmetrical.

The first mass portion 21 takes the shape of a frame (more specifically, a rectangular loop). The first mass portion 21 has a ferromagnet 291 provided in a position separate from the rotation central axis X thereof. In this embodiment, the ferromagnet 291 is provided near the upper surface of the right edge of the first mass portion 21 in FIG. 2, and extends in parallel to the rotation central axis X.

The ferromagnet 291 takes the shape of a thin film and is mainly made of a ferromagnetic material.

Such a ferromagnetic material is not limited to a particular one and various types of soft magnetic material or various types of hard magnetic material can be used. In this embodiment, the ferromagnet 291 is mainly made of a soft magnetic material, such as Fe, various types of Fe alloy (ferrosilicon, permalloy, amorphous sendust, etc.), or soft magnetic ferrite.

The ferromagnet 291 is provided in a position separate from the rotation central axis X of the first mass portion 21 when seen from above so that the ferromagnet 291 extends over the approximately entire ferromagnet 291 in the direction of the rotation central axis X. This allows a magnetic field generated from coil 28 to be discussed later to effectively act on the ferromagnet 291. This allows the deflection angles of the first and second mass portions 21 and 25 to be increased while further promoting power-saving and size reduction of the actuator.

The second mass portion 25 is provided inside the first mass portion 21 taking the shape of a frame as described above with the second mass portion 25 being separate from the first mass portion 21.

The second mass portion 25 takes the shape of a plate and has a light reflector 251 provided on the plate surface (upper surface) thereof. This allows the actuator 1 to be applied to optical devices, such as optical scanners, optical attenuators, and optical switches.

With regard to the first and second mass portions 21, 25, the first mass portion 21 is coupled to the supporting portion 22 via the first elastic portions 23, 24, and the second mass portion 25 is coupled to the first mass portion 21 via second elastic portions 26, 27.

The pair of first elastic portions 23, 24 can both become deformed elastically and couples between the first mass portion 21 and the supporting portion 22 so as to render the first mass portion 21 rotatable to the supporting portion 22. In other words, the pair of elastic portions 23, 24 can become deformed elastically and couples the first mass portion 21 to the supporting portion 22 so that the first mass portion 21 is supported by the supporting portion 22 from both sides.

The pair of second elastic portions 26, 27 can both become deformed elastically and couples between the second mass portion 25 and the first mass portion 21 so as to render the second mass portion 25 rotatable to the first mass portion 21. In other words, the pair of second elastic portions 26, 27 can become deformed elastically and couples the second mass portion 25 to the first mass portion 21 so that the second mass portion 25 is supported by the first mass portion 21 from both sides.

The first elastic portions 23, 24 and the second elastic portions 26, 27 are provided coaxially. Using these portions as the rotation central axis (rotation axis) X renders the first mass portion 21 rotational to the supporting portion 22 as well as the second mass portion 25 rotational to the first mass portion 21.

As described above, the base 2 includes a two-degree-of-freedom vibration system including a first vibration system including the first mass portion 21 and the pair of first elastic portions 23, 24 and a second vibration system including the second mass portion 25 and the pair of second elastic portions 26, 27.

The base 2 including such a two-degree-of-freedom system is mainly made of, for example, silicon. The base 2 is obtained by integrally forming the first mass portion 21, the second mass portion 25, the supporting portion 22, the first elastic portions 23, 24, and the second elastic portions 26, 27. Therefore, processing a single board when manufacturing the actuator 1 allows a structure including these components to be easily manufactured.

The supporting portion 22 for supporting a two-degree-of-freedom vibration system as described above takes the shape of a frame so as to surround the perimeter of the first pass portion 21.

As shown in FIG. 1, the coil 29 is provided near the lower surface of the supporting portion 22 so as to go along the rotation central axis X and the right part of the supporting portion 22 relative to a rotation central axis 28 shown in FIG. 2. The coil 28 is provided on the surface of the second mass portion 25 remote from the light reflector 251 described above, so no freedom in designing the light reflector 251 is reduced.

As shown in FIG. 1, the coil 28 is formed along the rotation central axis X of the first mass portion 21 and the supporting portion 22 (right portion thereof described above) so as to orbit the ferromagnet 291 described above when the first mass portion 21 is seen from above (also referred to as "when seen from above").

More specifically, the coil 28 includes a first portion 281 extending along the rotation central axis X and a second portion 282 formed below a side of the supporting portion 22 via the rotation central axis X of the supporting portion 22. The first portion 281 has a first end thereof coupled to the second portion 282 and a second end thereof coupled to a terminal 283. An end of the second portion 282 remote from the end thereof coupled to the first portion 281 is coupled to a terminal 284.

When seen from above, the ferromagnet 291 is positioned in the opening of the coil 28, which is the central portion of the coil 28. In other words, the ferromagnet 291 is disposed in the proximity of the central portion of the coil 28 when seen from above. This allows a magnetic field generated from the coil 28 to effectively act on the ferromagnet 291. This allows an increase in deflection angle while further promoting power-saving and size reduction.

As shown in FIG. 3, the pair of terminals 283, 284 are coupled to a power supply circuit 5 serving as a voltage application unit. The power supply circuit 5 is configured to intermittently apply a direct current (that is, periodically turn on/off a voltage) to the coil 28 via the pair of terminals 283, 284.

The power supply circuit 5 may apply an alternating current to the coil 28. In this case, the ferromagnet 291 is preferably mainly made of a hard magnetic material, as well as preferably magnetized in its thickness direction.

The coil 28 includes a unilaminar metal layer made of metal such as Al, or Cu. This allows the coil 28 to be formed on a single occasion, thus simplifying manufacture of the actuator 1. This allows a reduction in the cost of the actuator 1. Further, since the coil 28 can be made a relatively thin one, the influence of the coil 28 on the vibration characteristic of the actuator 1 is reduced and the design of the actuator 1 is simplified.

Bonded to the lower surface of the supporting portion 22 of the base 2 as described is a supporter 3.

The supporter 3 is mainly made of glass or silicon. The base 2 and the supporter 3 may be bonded together via a bonding layer mainly made of, for example, glass, silicon, or $SiO_2$.

The supporter 3 includes a board 31 and a frame 32 bonded to the upper surface of the board 31 and takes the shape of a tray having a recess 33. The board 31 and the frame 32 may be formed integrally. The shape of the supporter 3 is not limited to what is described above and may be one in which the board 31 is omitted, depending on the rigidity of the frame 32. The supporter 3 may be omitted depending on the rigidity, shape, or the like of the supporter 3 of the base 2.

Bonding the upper surface of the frame 32 to the lower surface of the base 2 allows the supporter 3 to support the base 2 from below.

When the two-degree-of-freedom vibration system of the base 2 vibrates, that is, when the first and second mass portions 21 and 25 rotate (vibrate), the recess 33 serves as an escape portion for preventing the vibration system from making contact with the supporter 3. Providing the recess (escape portion) 33 allows the deflection angles (amplitudes) of the first and second mass portions 21 and 25 to be set to larger ones while preventing upsizing of the entire actuator 1.

In the actuator 1 as described above, the coil 28, the power supply circuit 5, and the ferromagnet 291 serve as a driver for driving the first mass portion 21.

Such a driver acts as follows to drive the actuator 1.

Applying a direct current to the coil 28 intermittently by the power supply circuit 5 causes the coil 28 to intermittently generate a magnetic field in the thickness direction of the first mass portion 21.

Such a magnetic field causes an attraction force between the ferromagnet 291 and the coil 28.

This causes the ferromagnet 291 to be displaced relative to the coil 28 in the thickness direction of the first mass portion 21. Accordingly, the first elastic portions 23, 24 become deformed torsionally, thereby causing the first mass portion 21 to rotate (vibrate) to the supporting portion 22.

As the first mass portion 21 vibrates (drives), the second mass portion 25, which is coupled to the first mass portion 21 via the second elastic portions 26, 27, also vibrates (rotates) in such a manner that second mass portion is inclined toward the plate surface (paper surface of FIG. 1) of the supporter 3 as the second elastic portions 26, 27 used as axes.

In such actuator 1, the driver for driving the first mass portion 21 includes the coil 28 as described above, the power supply circuit 5, and the ferromagnet 291. This allows a reduction in the distance between the coil 28 and the ferromagnet 291 without preventing rotation of the first mass portion 21. This allows an increase in the rotation angle (deflection angle) of the first mass portion 21 while promoting size reduction and power-saving of the actuator 1, eventually increasing the rotation angle (deflection angle) of the second mass portion 25.

In particular, since the coil 28 and the ferromagnet 291 is separate from each other in the thickness direction of the first mass portion 21, and the ferromagnet 291 is mainly made of a soft magnetic material, there is no need to magnetize the ferromagnet 291, thereby simplifying manufacture of the actuator 1.

Further, since the power supply circuit 5 as a power application unit is configured to apply a direct current to the coil 28 intermittently, the configuration of the power supply circuit 5 is made a relatively simple one, thereby reducing the cost of the actuator 1.

Further, since the coil 28 is provided on a first surface of the first mass portion 21 and the ferromagnet 291 is provided on a second surface thereof, none of the first and second mass portions 21 and 25 is prevented from rotating, and the coil 28 and the ferromagnet 291 are properly separated from each other in the thickness direction of the first mass portion 21 relatively easily and accurately.

The actuator 1 as described above is preferably configured so that the maximum rotation angle of the second mass portion 25 is 20 or more.

Incidentally, in such a two-degree-of-freedom vibration system, there is a frequency characteristic between the amplitudes (deflection angles) of the first and second mass portions 21 and 25 and the frequency (frequency of on/off of a voltage) of a voltage applied to the coil 28, as shown in FIG. 4.

That is, this vibration system has two resonance frequencies $fm_1$ [kHz], $fm_3$ [kHz] ($fm_1 < fm_3$) at which both the amplitudes of the first and second mass portions 21 and 25 are increased and an antiresonance frequency $fm_2$ [kHz] at which the amplitude of the first mass portion 21 becomes approximately 0.

In this vibration system, a frequency F of a voltage to be applied to the coil 28 is set up to be approximately equal to the lower one of the two resonance frequencies, that is, $fm_1$. This increases the deflection angle (rotation angle) of the second mass portion 25 while controlling the amplitude of the first mass portion 21.

In this specification, "F [kHz] is approximately equal to $fm_1$ [kHz]" means satisfying the condition of $(fm_1-1) \leq F \leq (fm_1+1)$.

The average thickness of the first mass portion 21 is preferably 1 to 1500 μm, more preferably 10 to 300 μm.

The average thickness of the second mass portion 25 is preferably 1 to 1500 μm, more preferably 10 to 300 μm.

The spring constants of the first elastic portion 23, 24 are preferably $1 \times 10^{-3}$ to $1 \times 10^5$ Nm/rad, more preferably $1 \times 10^{-2}$ to $1 \times 10^4$ Nm/rad, even more preferably $1 \times 10^{-1}$ to $1 \times 10^3$ Nm/rad. This increases the rotation angle (deflection angle) of the second mass portion 25.

On the other hand, the spring constants $k_2$ of the second elastic portions 26, 27 are preferably $1 \times 10^{-4}$ to $1 \times 10^4$ Nm/rad, more preferably $1 \times 10^{-2}$ to $1 \times 10^3$ Nm/rad, even more preferably $1 \times 10^{-1}$ to $1 \times 10^2$ Nm/rad. This allows an increase in the defection angle of the second mass portion 25 while controlling the deflection angle of the first mass portion 21.

If the spring constant of the first elastic portions 23, 24 is defined as $k_1$ and the spring constant of the second elastic portions 26, 27 is defined as $k_2$, it is preferable to satisfy the relation $k_1 > k_2$. This allows an increase in the rotation angle (deflection angle) of the second mass portion 25 while controlling the deflection angle of the first mass portion 21.

Further, if the moment of inertia of the first mass portion 21 is defined as $J_1$ and that of the second mass portion 25 is defined as $J_2$, $J_1$ and $J_2$ preferably satisfy the relation $J_1 \leq J_2$, more preferably satisfy the relation $J_1 < J_2$. This allows an increase in the rotation angle (defection angle) of the second mass portion 25 while controlling the deflection angle of the first mass portion 21.

The characteristic frequency $\omega_1$ of the first vibration system including the first mass portion 21 and first elastic portions 23, 24 is given by $\omega_1=(k_1/J_1)^{1/2}$ using the moment of inertia $J_1$ of the first mass portion 21 and the spring constant $k_1$ of the first elastic portions 23, 24. On the other hand, the characteristic frequency $\omega_2$ of the second vibration system including the second mass portion 25 and second elastic portions 26, 27 is given by $\omega_2=(k_2/J_2)^{1/2}$ using the moment of inertia $J_2$ of the second mass portion 25 and the spring constant $k_2$ of second elastic portions 26, 27.

The characteristic frequency $\omega_1$ of the first vibration system and the characteristic frequency $\omega_2$ of the second vibration system thus obtained preferably satisfy the relation $\omega1>\omega2$. This allows an increase in the rotation angle (deflection angle) of the second mass portion 25 while controlling the deflection angle of the first mass portion 21.

Second Embodiment

An actuator according to a second embodiment of the invention will now be described.

Figure 5:
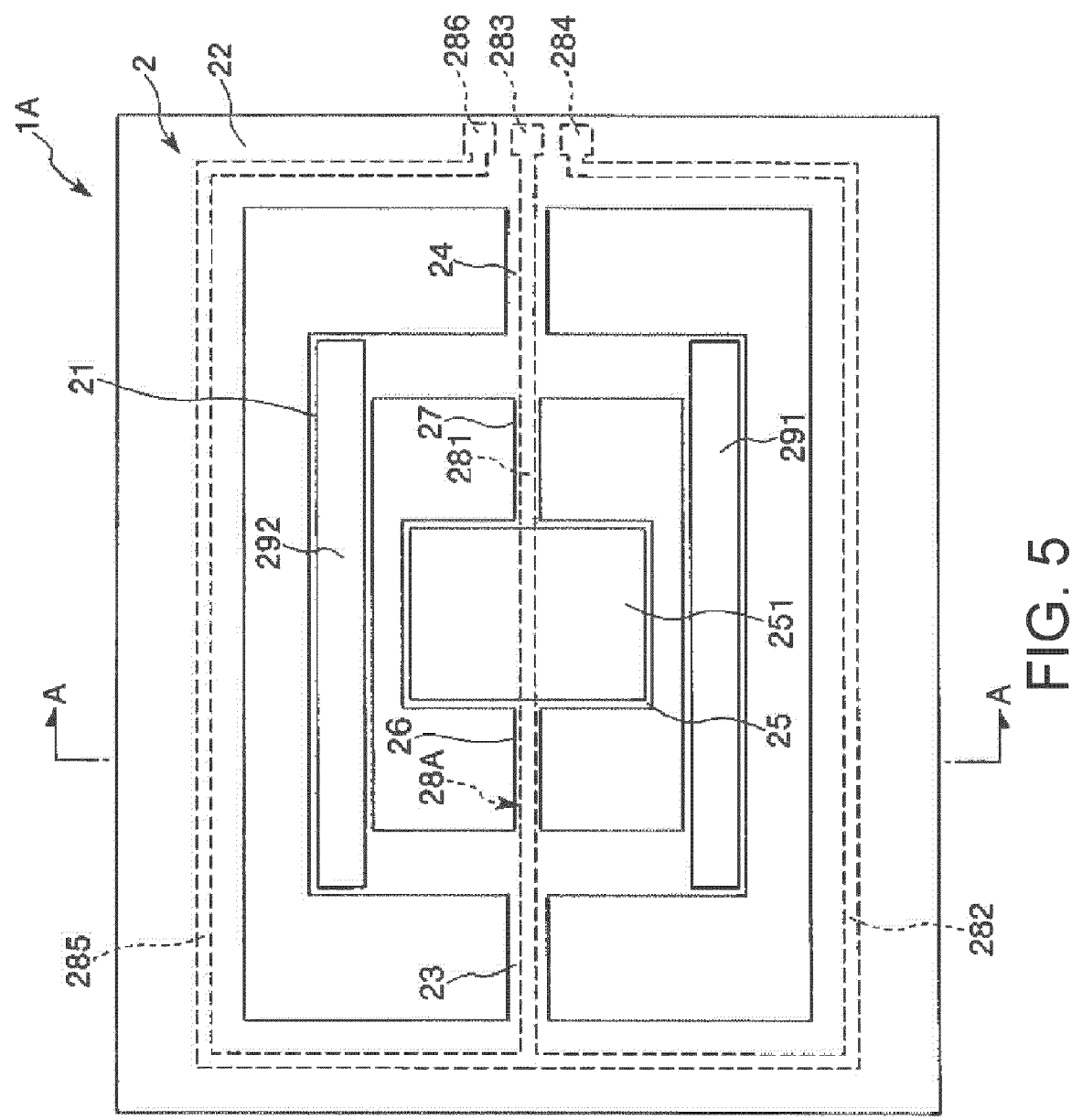
FIG. 5 is a plan view showing an actuator according to a second embodiment of the invention.
Figure 6:
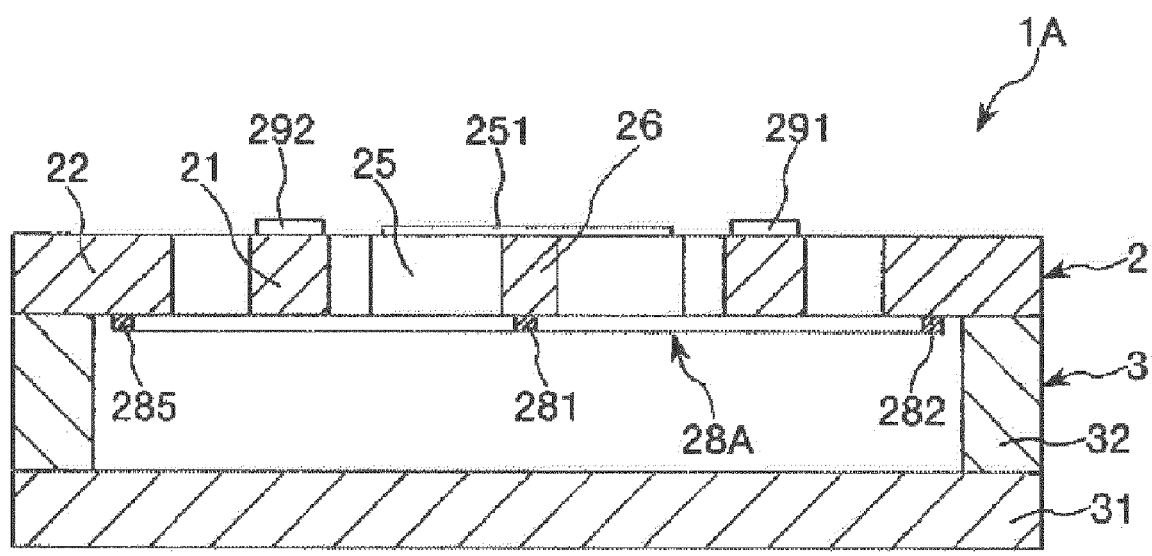
FIG. 6 is a sectional view taken along line A-A of FIG. 5.

FIG. 5 is a plan view showing the actuator according to the second embodiment of the invention. FIG. 6 is a sectional view taken along line A-A of FIG. 5.

With regard to the actuator according to the second embodiment, description will be focused on the differences between the actuators according to the second and first embodiments and similar matters will not be described.

As shown in FIGS. 5 and 6, an actuator 1A according to the second embodiment is approximately similar to the first embodiment except that its coil shape and power supply circuit configuration are different from those of the actuator according to the first embodiment.

As shown in FIGS. 5 and 6, in the actuator 1A according to the second embodiment, the coil 28A is formed along the rotation central axis X and the supporting portion 22 so that a coil 28A is symmetrical to the rotation central axis X when seen from above.

More specifically, the coil 28A includes a first portion 281 extending along the rotation central axis X and a pair of second portions 282, 285 formed on both sides of the rotation central axis X of the supporting portion 22 along the axis. The first portion 281 has a first end thereof coupled to each of the pair of second portions 282, 285 and a second thereof coupled to a terminal 283. Terminals 284, 286 are coupled to the ends of the pair of second portions 282, 285, respectively, remote from the ends which the pair of second portions 282, 285 are coupled to the first portion 281.

The power supply circuit 5 is configured alternately to intermittently apply a direct current to a coil including the first portion 281 and second portion 282 via the terminals 283, 284 and to intermittently apply a direct current to a coil including the first portion 281 and second portion 285 via the terminals 283, 285.

In other words, the power supply circuit 5 is configured to apply a direct current alternately to the coil including the first portion 281 and second portion 282 and to the coil including the first portion 281 and second portion 285.

In the actuator 1A as described above, the coil 28A, the power supply circuit 5, and ferromagnets 291, 292 constitute a driver for driving the first mass portion 21.

The actuator 1A according to the second embodiment has the above-mentioned driver in addition to similar advantages to those of the actuator 1 according to the first embodiment, so it allows smooth rotation of the first and second mass portions 21, 25 while preventing movement of the rotation central axis X.

The actuators 1, 1A as described above are applicable, for example, to optical scanners, optical switches, and optical attenuators.

If the actuator 1 or 1A is used as an optical scanner, the actuator 1 or 1A (optical scanner according to the invention) scans light reflected off an optical reflector 251. Since such an optical scanner according to the invention allows an increase in the rotation angle of the second mass portion 25, the distance between the target (e.g., photosensitive material or screen) and the actuator 1 (optical scanner) is reduced.

Such an optical scanner is suitably applied, for example, to image-forming devices such as laser printers, imaging displays, bar-code readers, and confocal scanning microscopes.

Since an image-forming device (image-forming device according to the invention) including the actuator 1 or 1A for use as an optical scanner allows an increase in the rotation angle of the second mass portion 25, the image-forming device main-scans and/or sub-scans light emitted toward the target over a wide range while reducing the distance between the target (e.g., photosensitive material 11 or screen 197 to be discussed later) and the actuator 1 (optical scanner). This allows downsizing of the image-forming device. If the image-forming device according to the invention is applied to a display such as an imaging display, the distance between the target (screen 197 to be discussed later) and the actuator 1 (optical scanner) is reduced, upsizing of an image-forming device is controlled, and the size of the screen as a display area is increased.

Specific examples of an image-forming device including the optical scanner according to the invention will now be described.

An example in which the invention is applied to a printer using electrophotography will be described.

Figure 7:
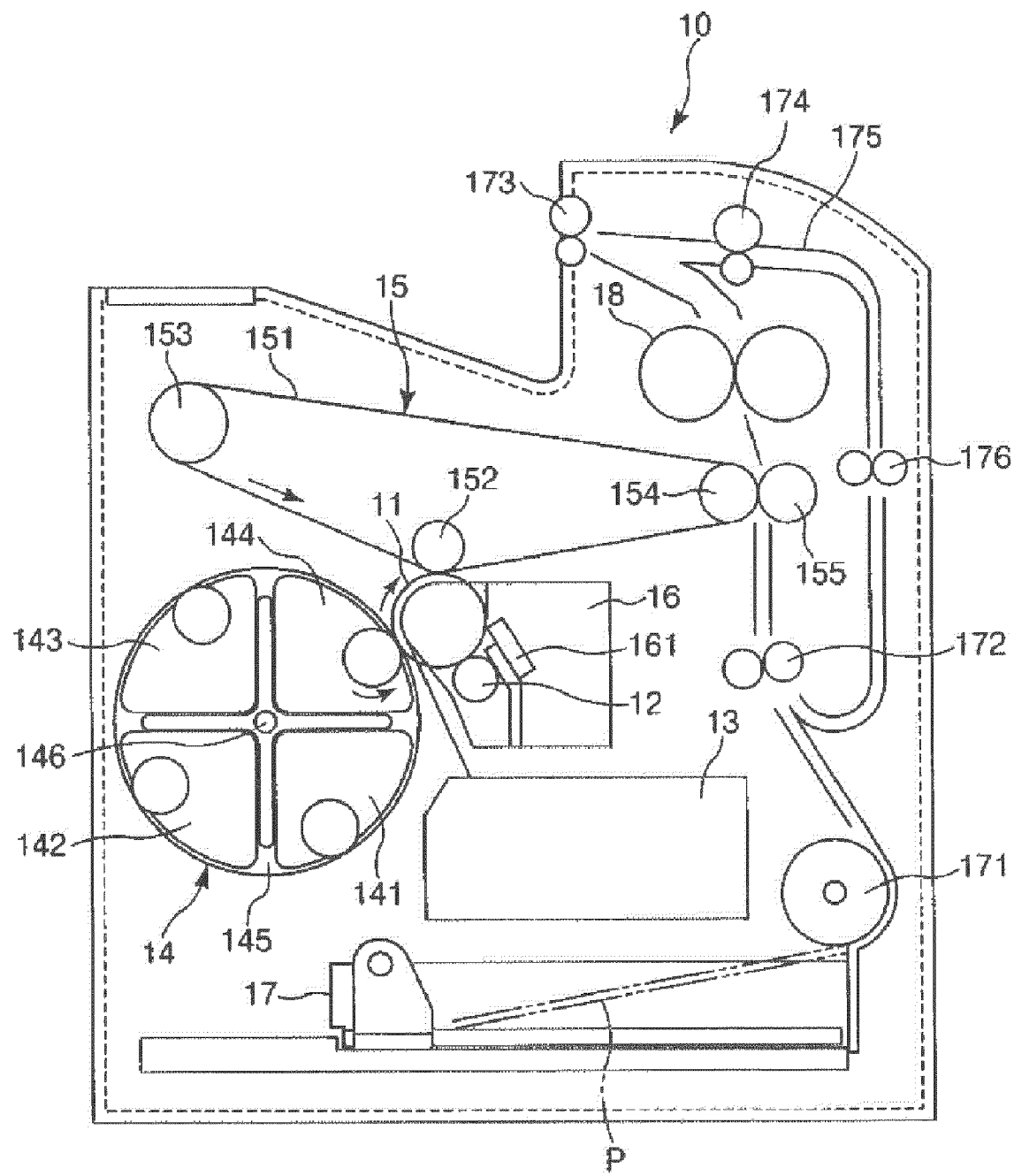
FIG. 7 is a schematic sectional view showing an example of an image-forming device (printer) including an optical scanner according to the invention.

FIG. 7 is an overall schematic sectional view showing an example of an image-forming device including the optical scanner according to the invention.

An image-forming device 10 (printer) shown in FIG. 7 is one that performs a series of image-forming processes, including exposure, development, transfer, and fixing, to record images made of toner to a recording medium such as a paper sheet or an overhead transparency film. As shown in FIG. 7, the image-forming device 10 as described above has a photosensitive material 11 that rotates in the direction of the indicated arrow, and also has a charging unit 12, an exposure unit 13, a development unit 14, a transfer unit 15, and a cleaning unit 16 disposed sequentially along with the rotating direction of the photosensitive material 11. In FIG. 7, the image-forming device 10 also has a paper feed tray 17 for holding a recording medium P, such as a paper sheet, provided in a lower part thereof and a fixing unit 18 provided in an upper part thereof.

The photosensitive material 11 is obtained by forming a photosensitive layer (now shown) on the periphery of a cylindrical, conductive base material (not shown), and is rotatable around its axis.

The charging unit 12 is a unit for uniformly charging the surface of the photosensitive material 11 by corona charging or the like.

The exposure unit 13 is a unit that receives image information from a host computer (not shown) such as a personal computer and selectively emits lasers to the uniformly charged photosensitive material 11 according to the received image information to form electrostatic, latent images.

Figure 8:
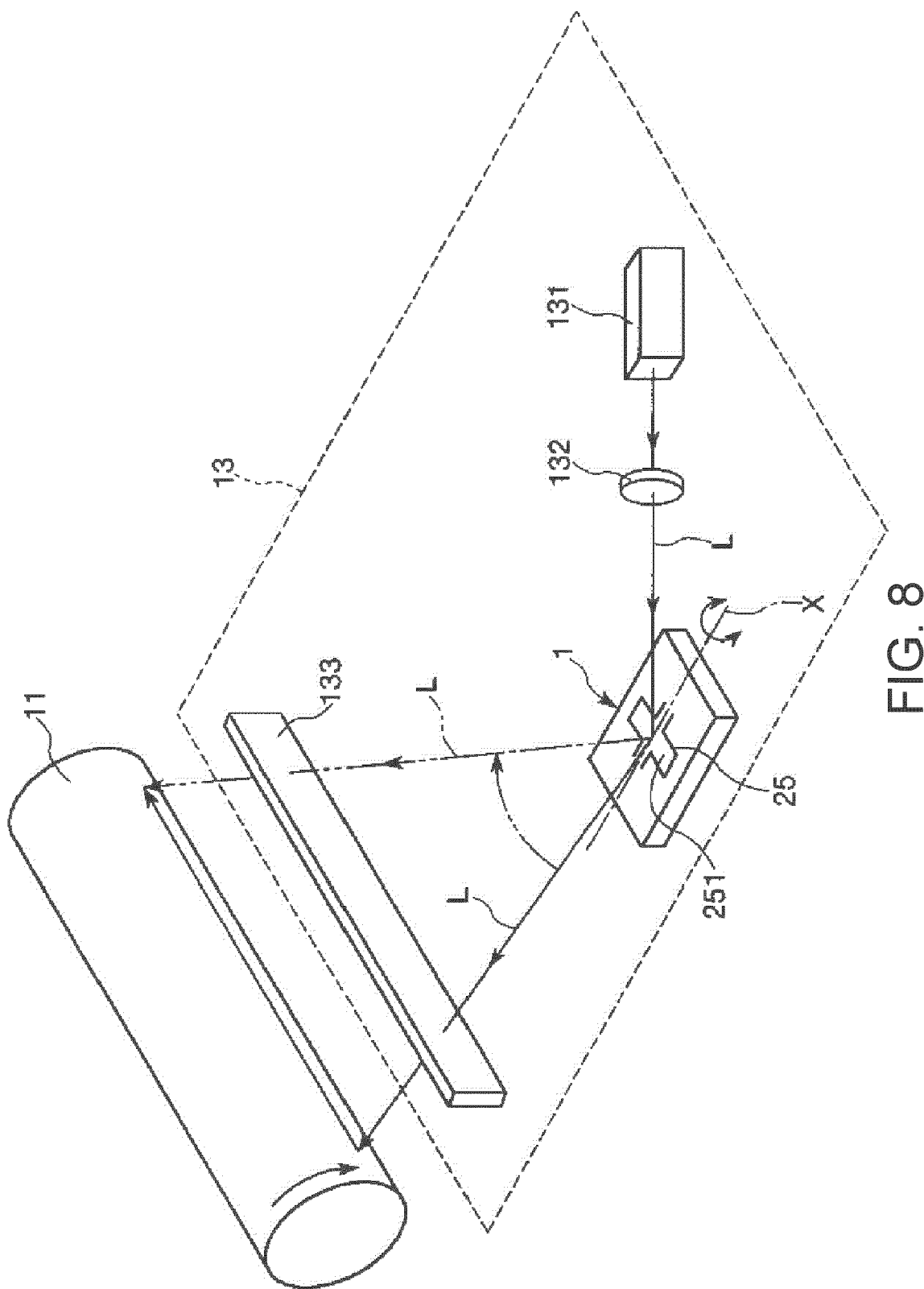
FIG. 8 is a diagram showing a schematic configuration of an exposure unit provided on the image-forming device shown in FIG. 7.

More specifically, as shown in FIG. 8, the exposure unit 13 includes the actuator 1 as an optical scanner, a laser light source 131, a collimator lens 132, and an fθ lens 133.

In the exposure unit 13 as described above, the actuator 1 (light reflector 251) is irradiated with a laser beam L emitted from the laser light source 131 via the collimator lens 132. Then the photosensitive material 11 is irradiated with the laser beam L reflected off the light reflector 251 via the fθ lens.

At that time, the light beam (laser L) reflected off the light reflector 251 is scanned (main-scanned) in the axis direction of the photosensitive material 11 by the driving of the actuator 1 (rotation of the second mass portion 25 around the rotation central axis X). On other hand, the light beam (laser L) reflected off the light reflector 251 is scanned (sub-scanned) in the circumference direction of the photosensitive material 11 by the rotation of the photosensitive material 11. The intensity of the laser beam L outputted from the laser light source 131 varies depending on image information received from a host computer (not shown).

In this way, the exposure unit 13 selectively exposes the photosensitive material 11 to form images.

The development unit 14 includes four development devices 141, 142, 143, and 144 and a holder 145 for holding these development devices. Rotating the holder 145 around the axis 46 causes each development device to selectively face the photosensitive material 11. Here, the development device 141 is one for black (K) toner, the development device 142 is one for magenta (M) toner, the development device 143 is one for cyan (C) toner, and the development device 144 is one for yellow (Y) toner.

The transfer unit 15 includes an intermediate transfer belt 151 in the form of an endless belt, three rollers over which the intermediate transfer belt 151 is suspended (primary transfer roller 152, driven roller 153, drive roller 154), and a secondary transfer roller 155 that faces the drive roller 154 via the intermediate transfer roller 151.

The intermediate transfer belt 151 is driven and rotated in the direction of the arrow shown in FIG. 7 by rotation of the drive roller 154 at an approximately identical circumferential velocity to that of the photosensitive material 11 while driving and rotating the primary transfer roller 152 and the driven roller 153.

The primary transfer roller 152 is one for transferring monochrome toner images formed on the photosensitive material 11 to the intermediate transfer roller 151.

The secondary transfer roller 155 is one for transferring toner images in monochrome, full color, or the like formed on the intermediate transfer roller 151 to a recording medium P such as a paper sheet, a film, or cloth.

The fixing unit 18 is one for applying heat or pressure to the recording medium P that has received the toner images to fuse the toner images to the recording medium P to fix the images to the medium as permanent images.

The cleaning unit 16 includes a rubber-made cleaning blade 161 that abuts on the surface of the photosensitive material 11 between the primary transfer roller 152 and charging unit 12. The cleaning unit 16 is a unit for scraping remaining toner off the photosensitive material 11 using the cleaning blade 161 after toner images are transferred onto the intermediate transfer roller 151 by the primary transfer roller 152.

In the image-forming device 10 as described above, the photosensitive material 11, an development roller (not shown) provided on the development unit 14, and the intermediate transfer belt 151 initially begin to rotate according to an instruction from the host computer (not shown). Then, regions of the photosensitive material 11 are sequentially charged by the charging unit 12 while rotating.

As the photosensitive material 11 rotates, the charged region of the photosensitive material 11 reaches the exposure position. Then a latent image corresponding to image information on a first color, for example, yellow Y is formed on the region by the exposure unit 13.

As the photosensitive material 11 rotates, the latent image formed on the photosensitive material 11 reaches the development position, and is developed using yellow toner by the development device 144 for yellow development. Thus a yellow toner image is formed on the photosensitive material 11. At this time, the development unit 144 is facing the photosensitive material 11 in the above-mentioned development position.

As the photosensitive material 11 rotates, the yellow toner image formed on the photosensitive material 11 reaches the primary transfer position (that is, a portion in which the photosensitive material 11 and the primary transfer roller 152 are facing each other) and is transferred (primary transfer) to the intermediate transfer belt 151 by the primary transfer roller 152. At this time, a primary transfer voltage (primary transfer bias) having an inverse polarity to the charging polarity of the toner is applied to the primary transfer roller 152. During this period, the secondary transfer roller 155 is separated from the intermediate transfer belt 151.

Processes similar to the above-mentioned process are repeatedly performed with respect to a second color, a third color, and fourth color. Thus toner images having a color corresponding to each image signal are transferred to the intermediate transfer belt 151 in such a manner that the toner images overlap each other. As a result, a full-color toner image is formed on the intermediate transfer belt 151.

On the other hand, the recording medium P is carried from the paper feed tray 17 to the secondary transfer position (that is, a part in which the secondary transfer roller 155 and the drive roller 154 are facing each other) by a paper feed roller 171 and a registration roller 172.

As the intermediate transfer belt 151 rotates, the full-color toner image formed on the intermediate transfer belt 151 reaches the secondary transfer position and is transferred (secondary transfer) to the recording medium P by the secondary transfer roller 155. At this time, the secondary transfer roller 155 is pressed against the intermediate transfer belt 151, as well as subjected to application of a secondary transfer voltage (secondary transfer bias).

The full-color toner image transferred to the recording medium P is subjected to application of heat and pressure by the fixing unit 18 so that the full-color toner image is fused onto the recording medium P. Thereafter, for one-sided printing, the recording medium P is ejected from the image-forming device 10 by an ejection roller pair 173.

On other hand, after passing through the primary transfer position, the photosensitive material 11 has the toner adhering to the surface thereof scraped off by the cleaning blade 161 of the cleaning unit 16 and prepares for a charge for forming the subsequent latent image. The scraped toner is reclaimed in a remaining toner reclamation section in the cleaning unit 16.

For two-sided printing, the recording medium P, a first surface of which has gone through the fixing process, is temporarily interposed between the ejection roller pair 173. Subsequently, driving the ejection roller 173 in reverse as well as driving the carrying roller pair 174, 176 causes the recording medium P to return to the secondary transfer position via a carrying route 175 with the front and back sides of the medium inverted. Then, an image is formed on a second surface of the recording medium P by performing an operation similar to the above-mentioned one.

Hereafter, an example in which the invention is applied to an imaging device (display) will be described.

Figure 9:
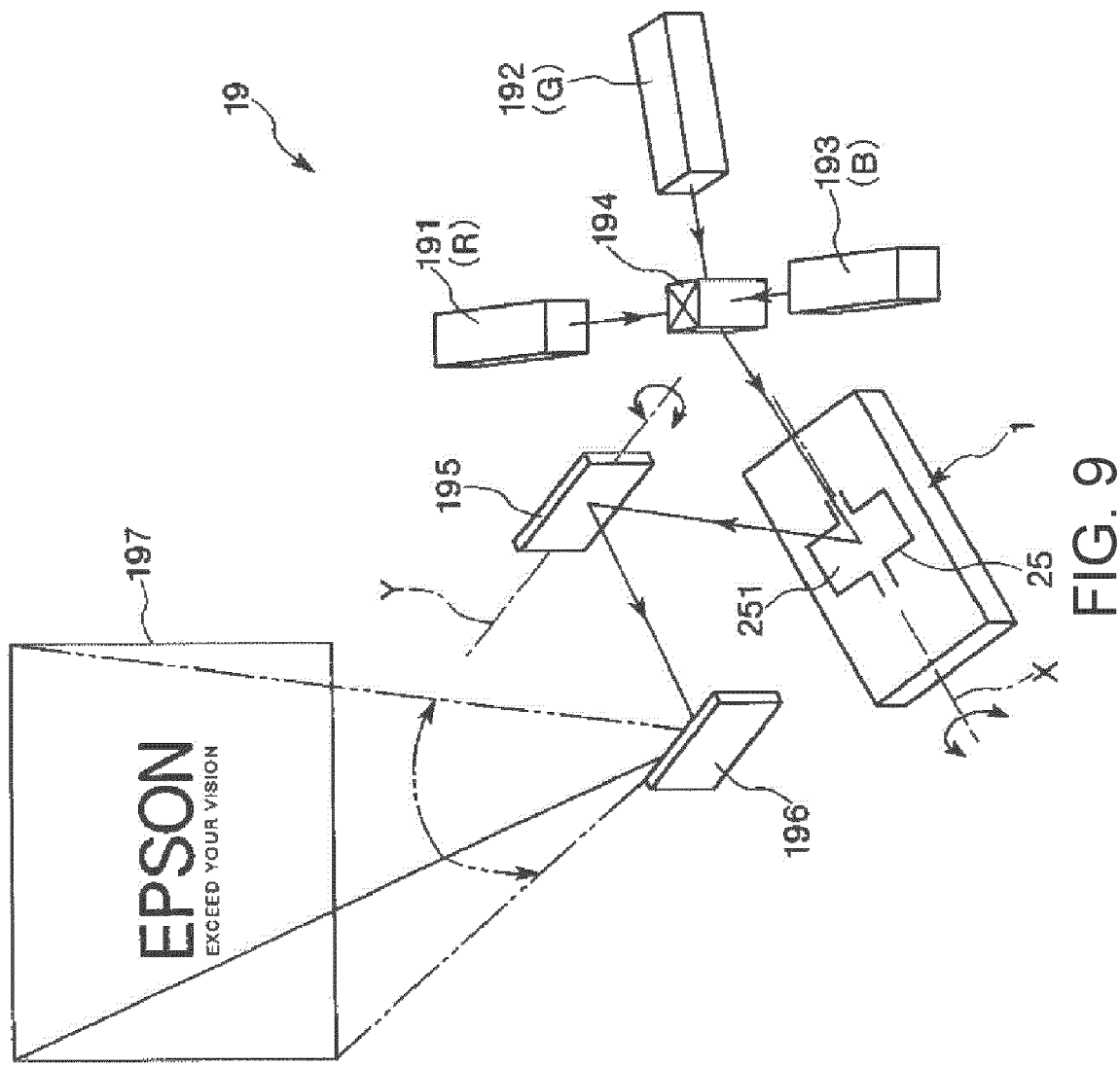
FIG. 9 is a schematic sectional view showing an example of an image-forming device (imaging display) including an optical scanner according to the invention.

An image-forming device 19 shown in FIG. 9 includes the actuator 1 as an optical scanner, light sources 191, 192, 193 for three colors, R (red), G (green), B (blue), a cross dichroic prism (x prism) 194, a galvanometer mirror 195, a fixed mirror 196, and a screen 197.

In the image-forming device 19 as described above, the actuator 1 (light reflector 251) is irradiated with light beams from the light sources 191, 192, 193 via the cross dichroic prism (x prism) 194. At this time, the light beam in red from the light source 191, the light beam in green from the light source 192, and the light beam in blue from the light source 193 are combined in the cross dichroic prism 194.

A light beam (three-color composite light beam) reflected off the light reflector 251 is reflected off the galvanometer mirror 195, and then reflected off the fixing mirror 196 and applied onto the screen 197.

At this time, the light beam reflected off the light reflector 251 is scanned (main-scanned) in the transverse direction of the screen 197 by driving (rotation of the second mass portion 25 around the rotation central axis X) of the actuator 1. On the other hand, the light beam reflected off the light reflector 251 by rotation of the galvanometer mirror 195 around the axis Y is scanned (sub-scanned) in the longitudinal direction of the screen 197. The intensity of light beams outputted from the light sources 191, 192, 193 for each color varies depending on image information received from a host computer (not shown).

While the actuator, optical scanner, and image-forming device according to the invention has heretofore been described based on the illustrated embodiments, the invention is not limited to these embodiments. For example, in the actuator and the like according to the invention, the configuration of each component can be replaced with an arbitrary configuration having a similar function or an arbitrary configuration can be added to each component.

In the above-mentioned embodiments, description has been made on the structure taking the shape that is approximately symmetrical (left-right symmetrical) to a plane passing through the center of the actuator and orthogonal to the rotation axis of the mass portions and drive portion; however, the structure may take an asymmetrical shape.

Further, while the configuration in which the light reflector is provided on the upper surface (surface remote from the supporting board) of the second mass portion has been described in the above-mentioned embodiments, the light reflector may be provided, for example, on the lower surface thereof.

What is claimed is:

1. An actuator comprising:
   a frame-shaped first mass portion;
   a supporting portion for supporting the first mass portion, the supporting portion taking a shape of a frame so as to surround a perimeter of the first mass portion;
   a pair of first elastic portions coupling between the first mass portion and the supporting portion so that the first mass portion is supported by the supporting portion;
   a second mass portion provided inside the frame-shaped first mass portion;
   a pair of second elastic portions coupling between the second mass portion and the first mass portion so that the second mass portion is supported by the first mass portion; and
   a driver for rotating the first mass portion, the driver including:
      a ferromagnet provided on the first mass portion in a position separate from a rotation central axis of the first mass portion;
      a coil formed along the rotation central axis of the first mass portion and the supporting portion so as to surround and orbit a perimeter of the ferromagnet if the first mass portion is seen from above; and
      a voltage application unit for applying a voltage to the coil, wherein:
   an operation of the voltage application unit included in the driver causes the coil to generate a magnetic field;
   the generation of the magnetic field causes displacement of the ferromagnet relative to the coil;
   the displacement of the ferromagnet causes the first mass portion to rotate while torsionally deforming the pair of first elastic portions; and
   the rotation of the first mass portion causes the second mass portion to rotate while torsionally deforming the pair of second elastic portions.

2. The actuator according to claim 1, wherein the ferromagnet is mainly made of a soft magnetic material.

3. The actuator according to claim 2, wherein the voltage application unit is configured to intermittently apply a direct current to the coil.

4. The actuator according to claim 2, wherein:
   the coil is provided on a first surface of the first mass portion; and
   the ferromagnet is provided on a second surface of the first mass portion.

5. The actuator according to claim 1, wherein the first mass portion, the pair of first elastic portions, the second mass portion, the pair of second elastic portions, and the supporting portion are formed integrally.

6. The actuator according to claim 5, wherein the coil is formed of a unilaminar metal layer.

7. The actuator according to claim 1, wherein the ferromagnet is disposed near a central portion of the coil if the first mass portion is seen from above.

8. The actuator according to claim 1, wherein the ferromagnet is provided so as to extend over the entire first mass portion in a rotation central axis direction of the first mass portion in the separate position.

9. The actuator according to claim 1, wherein the second mass portion includes a light reflector having light reflectivity.

10. An optical scanner comprising:
    a frame-shaped first mass portion;
    a supporting portion for supporting the first mass portion, the supporting portion taking a shape of a frame so as to surround a perimeter of the first mass portion;
    a pair of first elastic portions coupling between the first mass portion and the supporting portion so that the first mass portion is supported by the supporting portion;
    a second mass portion provided inside the first mass portion, the second mass portion including a light reflector having light reflectivity;
    a pair of second elastic portions coupling between the second mass portion and the first mass portion so that the second mass portion is supported by the first mass portion; and
    a driver for rotating the first mass portion, the driver including:
       a ferromagnet provided on the first mass portion in a position separate from a rotation central axis of the first mass portion;
       a coil formed along the rotation central axis of the first mass portion and the supporting portion so as to surround and orbit a perimeter of the ferromagnet if the first mass portion is seen from above; and a voltage application unit for applying a voltage to the coil, wherein:

an operation of the voltage application unit included in the driver causes the coil to generate a magnetic field;

the generation of the magnetic field causes displacement of the ferromagnet relative to the coil;

the displacement of the ferromagnet causes the first mass portion to rotate while torsionally deforming the pair of first elastic portions; and the rotation of the first mass portion causes the second mass portion to rotate while torsionally deforming the pair of second elastic portions so that light reflected off the light reflector is scanned.

11. An optical scanner comprising:

a frame-shaped first mass portion;

a supporting portion for supporting the first mass portion, the supporting portion taking a shape of a frame so as to surround a perimeter of the first mass portion;

a pair of first elastic portions coupling between the first mass portion and the supporting portion so that the first mass portion is supported by the supporting portion;

a second mass portion provided inside the first mass portion, the second mass portion including a light reflector having light reflectivity;

a pair of second elastic portions coupling between the second mass portion and the first mass portion so that the second mass portion is supported by the first mass portion;

a driver for rotating the first mass portion, the driver including:

a ferromagnet provided on the first mass portion in a position separate from a rotation central axis of the first mass portion;

a coil formed along the rotation central axis of the first mass portion and the supporting portion so as to surround and orbit a perimeter of the ferromagnet if the first mass portion is seen from above; and a voltage application unit for applying a voltage to the coil; and a light emitter for emitting light toward the light reflector, wherein:

an operation of the voltage application unit included in the driver causes the coil to generate a magnetic field;

the generation of the magnetic field causes displacement of the ferromagnet relative to the coil;

the displacement of the ferromagnet causes the first mass portion to rotate while torsionally deforming the pair of first elastic portions; and the rotation of the first mass portion causes the second mass portion to rotate while torsionally deforming the pair of second elastic portions so that light reflected off the light reflector is main-scanned and/or sub-scanned to form an image on a target.

* * * * *